United States Patent
Rangachari et al.

(10) Patent No.: US 10,909,067 B2
(45) Date of Patent: Feb. 2, 2021

(54) MULTI-NODE ZERO-COPY MECHANISM FOR PACKET DATA PROCESSING

(71) Applicant: Futurewei Technologies, Inc., Plano, TX (US)

(72) Inventors: Muralidharan Rangachari, San Ramon, CA (US); Huida Dai, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 137 days.

(21) Appl. No.: 16/057,006

(22) Filed: Aug. 7, 2018

(65) Prior Publication Data

US 2020/0050576 A1  Feb. 13, 2020

(51) Int. Cl.
  *G06F 15/173* (2006.01)
  *H04L 12/721* (2013.01)
  *H04L 12/851* (2013.01)

(52) U.S. Cl.
  CPC ...... *G06F 15/17331* (2013.01); *H04L 45/566* (2013.01); *H04L 47/2441* (2013.01)

(58) Field of Classification Search
  CPC ............. G06F 15/17331; H04L 45/566; H04L 47/2441
  See application file for complete search history.

(56) References Cited

U.S. PATENT DOCUMENTS

| | | | |
|---|---|---|---|
| 2005/0125485 A1* | 6/2005 | Tripathi | H04L 69/32 709/201 |
| 2008/0002578 A1* | 1/2008 | Coffman | H04L 47/10 370/230 |
| 2013/0121137 A1 | 5/2013 | Feng et al. | |
| 2013/0144978 A1 | 6/2013 | Jain et al. | |
| 2015/0055620 A1 | 2/2015 | Vesterinen et al. | |
| 2015/0055621 A1 | 2/2015 | Koskinen | |
| 2016/0050122 A1 | 2/2016 | Cortes Gomez et al. | |
| 2017/0124021 A1* | 5/2017 | Brown | H04L 67/1091 |

(Continued)

FOREIGN PATENT DOCUMENTS

| | | |
|---|---|---|
| CN | 105227645 A | 1/2016 |
| CN | 106230917 A | 12/2016 |

(Continued)

OTHER PUBLICATIONS

"International Application No. PCT/CN2019/098292, International Search Report and Written Opinion dated Oct. 23, 2019", (dated Oct. 23, 2019), 9 pgs.

(Continued)

*Primary Examiner* — Gil H. Lee

(74) *Attorney, Agent, or Firm* — Schwegman Lundberg & Woessner, P.A.

(57) ABSTRACT

In a system having multiple locally deployed apparatus arranged as separate physical nodes, each data packet of a set of data packets received in a physical node can be classified. Data packets of the set can be batched into one or more batches for processing by a physical node separate from the physical node in which the data packets are classified and batched. Access to a batch in the physical node by another physical node can be controlled using remote data memory access. Additional apparatus, systems, and methods are disclosed.

20 Claims, 8 Drawing Sheets

(56) References Cited

U.S. PATENT DOCUMENTS

| | | | |
|---|---|---|---|
| 2017/0237607 A1 | 8/2017 | Smith | |
| 2018/0054756 A1 | 2/2018 | Kahtava et al. | |
| 2018/0295053 A1* | 10/2018 | Leung | H04L 45/38 |
| 2018/0349396 A1* | 12/2018 | Blagojevic | G06F 16/183 |
| 2018/0367322 A1 | 12/2018 | Watanabe et al. | |
| 2019/0281495 A1 | 9/2019 | Wu et al. | |
| 2019/0373521 A1 | 12/2019 | Crawford | |
| 2020/0015293 A1 | 1/2020 | Wang et al. | |
| 2020/0053026 A1 | 2/2020 | Rangachari et al. | |

FOREIGN PATENT DOCUMENTS

| | | |
|---|---|---|
| CN | 107182091 A | 9/2017 |
| WO | WO-2014070738 A1 | 5/2014 |
| WO | WO-2015171414 A1 | 11/2015 |
| WO | WO-2016048144 A1 | 3/2016 |
| WO | WO-2018099046 A1 | 6/2018 |

OTHER PUBLICATIONS

"International Application No. PCT/CN2019/098293, International Search Report and Written Opinion dated Sep. 26, 2019", (dated Sep. 26, 2019), 9 pgs.

"Atomic Operations", Intel Developer Zone. [online]. [retrieved on Feb. 26, 2018]. Retrieved from the Internet: <URL: https://software.intel.com/en-us/node/506090>, (2018), 3 pgs.

"Data Plane Development Kit (DPDK)", [online]. [retrieved on Mar. 26, 2018]. Retrieved from the Internet: <URL: https://dpdk.org/>, (2018), 2 pgs.

"VPP—Vector Packet Processing", [online]. [retrieved on Mar. 26, 2018]. Retrieved from the Internet: <URL: https://wiki.fd.io/view/VPP>, (2018), 6 pgs.

Chu, J., et al., "Transmission of IP over InfiniBand (IPoIB)", RFC 4391, Network Working Group, (Apr. 2006), 21 pgs.

Fettweis, Gerhard, et al., "The Tactile Internet", ITU-T Technology Watch Report, (Aug. 2014), 24 pgs.

Ghodsi, Ali, et al., "Multi-Resource Fair Queueing for Packet Processing", Proceedings of the ACM Sigcomm 2012 Conference on Applications, Technologies, Architectures, and Protocols for Computer Communication, (2012), 12 pgs.

Han, Sangjin, et al., "SoftNIC: A Software NIC to Augment Hardware", Technical Report No. UCB/EECS-2015-155, Electrical Engineering and Computer Sciences, University of California at Berkeley, (May 27, 2015), 1-15.

Kohler, Eddie, et al., "The Click Modular Router", ACM Transactions on Computer Systems, 18(3), (Aug. 2000), 263-297.

"U.S. Appl. No. 16/057,087, Non Final Office Action dated May 4, 2020", 11 pgs.

* cited by examiner

MULTI-NODE ZERO-COPY MECHANISM FOR PACKET DATA PROCESSING

RELATED APPLICATIONS

This application is related to U.S. application Ser. No. 16/057,087, entitled "METHOD AND APPARATUS FOR VIRTUAL NETWORK FUNCTIONS AND PACKET FORWARDING" filed herewith on the same date, which patent application is incorporated herein by reference in its entirety.

FIELD OF THE INVENTION

The present disclosure is related to data communication and, in particular, data packet processing.

BACKGROUND

Many processing-based applications are becoming cloud-based. Typically, the term "cloud" refers to data processing on a number of virtual servers as opposed to directly on physical machines. A cloud could span across a wide area network (WAN). WAN is also commonly referred to the public Internet or sometimes also a network of leased optic fiber links that inter-connect multiple branch offices of an Enterprise. Or alternately, a cloud could be entirely resident within a private datacenter within an internal local area network. Datacenters of clouds, meaning datacenters that host virtual compute or services, can also provide services for network traffic management from one location on a network to another location on the network or across networks spanning far flung locations over WAN (or Internet). In addition, the term "cloud computing" refers to the software and services executed for users by these servers virtually (over a hypervisor), and typically the user is unaware of the physical location of the servers or datacenter. Further, the datacenter may be a distributed entity. Cloud computing can provide shared computer processing resources and data to computers and other devices on demand over the associated networks.

Associated with a network of a cloud are devices and software to perform functions for the network. Examples of such functions are switching, routing, establishing secured tunnels (VPN) etc. Such functions can be facilitated by virtual processes. A virtualized network function, or VNF, is responsible for handling specific network functions that would run in one or more virtual machines (a virtual machine being a self-contained operating environment that behaves as if it is a separate computer) on top of a hardware networking infrastructure. The hardware networking infrastructure can include routers, switches, servers, cloud computing systems, and more. VNFs can move individual network functions out of dedicated hardware devices into software that can run on commodity hardware. Many VNF deployments can be realized as cloud-based deployments.

Edge cloud is a new computing paradigm for distributed computing, which is being deployed to address issues with typical cloud computing that is performed by a centralized cloud. Such centralized clouds are constrained to address network latencies, which are critical in modern real-time applications. In addition, Internet bandwidth, associated with centralized cloud computing, is physically limited. A key concept for implementing edge cloud networking is to distribute processing across multiple small clouds to enable ultra-low latency response times, high throughput, and a highly flexible cloud platform. Because it is not in a centralized data center, the physical footprint requirements and type of hardware used in an edge cloud platform are different from traditional cloud platforms.

IoT is a network of physical devices, vehicles, home appliances and other items embedded with electronics, software, sensors, and actuators, which are enabled to connect and exchange data allowing for direct integration of devices in the physical world into computer-based systems. A criterion for IoT in 5G communication is a roundtrip latency of about 1 milliseconds. In any communication through a mobile provider, data packets are not simply forwarded but often processed through a set of virtual network functions (VNFs) executed by the mobile carrier or internet service provider. However, execution of each VNF uses CPU cycles, and hence adds to the accumulated to round-trip (RTT) latency. In addition to transporting data packets from a user equipment (UE), for real-time applications it is a challenge to accomplish such transport with 1 to 4 millisecond RTT latency as required by 5G. Today, the typical RTT is about 20 milliseconds.

Various approaches are being considered that are directed to attaining the RTT latency under 4 millisecond including services, that is, including VNFs that run in the infrastructure of such approaches. Clouds are evolving into distributed mesh structures. Deployment of edge networks may reduce such latency associated with reducing distance. In many approaches, micro-services, which allow in-place upgrades and modularity that is reusable and extensible, are preferred. A micro-service architecture structures an application as a collection of loosely-coupled services, each of which implements a unique capabilities and called a micro-service. A bunch of micro-services can be put together to form an application or a software service. Operationally, a micro-service architecture can enable continuous delivery and deployment of large, complex applications and can enable an organization to evolve its technology stack replacing individual micro-service or adding a new one.

VNFs in a data plane, which will need ultra low latency, may span physical nodes at a processing location, where the physical nodes can include hardware that is heterogeneous. A heterogeneous hardware means each physical server would comprise of special purpose hardware (ASICS or FPGA) for accelerated processing of data or packets for various application, and not all physical servers have same set of hardware. This implies micro-services spread across nodes for each micro-service (module) to use each of these special purpose hardware, while micro-services as a whole across nodes must exhibit as a single service to the external world. Because of high internode latencies associated with networking hardware and traditional networking protocols used, VNF micro-services can pay a latency penalty, if spread across nodes in a cluster at a location.

An edge cloud, in one sense, can be viewed as a cluster of systems that includes a number of individual, separate systems that each process data packets, where each system can be considered a physical node or host of the edge cloud. Since an edge cloud is not typically structured within one single physical host, associated services that comprise a VNF using micro-services may span across physical nodes. The amount of delays introduced by protocol and data link layer in a typical networking stack is not geared for carrier grade network functions, though it could be well suited for standard web applications using micro-services. Remote direct memory access (RDMA) specifically addresses the latency and throughput problems of transferring large amount of data between nodes such as storage applications, file systems etc. With RDMA used for networking, such as in Internet Protocol (IP) over Infiniband (IPOIB), it only reduces the data link layer delays. So, the performance would be close to using data plane development kit (DPDK) which uses Poll-Mode Drivers, avoiding kernel interrupts and minimizing data transfer between kernel and user space. The IP related delays such as transmission control protocol (TCP) lag will continue to be there. Technologies like Voltaire Messaging Accelerator (VMA), also referred to as Mellanox messaging accelerator, which intercepts traditional socket communication and uses RDMA to accelerate throughput, performs well for messaging but is not well suited for regular data plane networking uses.

SUMMARY

Systems and methods can be implemented that control forwarding of data packets in a system, such as edge cloud, equipment coupled to a larger cloud, or other such equipment, where the system has multiple physical nodes containing software modules for processing the data packets. A physical node can be a system having one or more processors and memory storage. A batch of data packets residing in a physical node of the system can be processed by a set of modules of software code, where some of the software modules reside in the physical node of the system and some of the software modules reside in another physical node of the system. Such processing can be performed using remote data memory access for a batch of data packets.

According to one aspect of the present disclosure, there is provided a system comprising a plurality of locally deployed apparatus arranged as separate physical nodes, with a physical node including: a memory storage comprising instructions; and one or more processors in communication with the memory storage, wherein the one or more processors execute the instructions to: classify each data packet of a set of data packets at the physical node; batch data packets of the set of data packets, forming a batch of data packets, based on the classification; and control access to the batch of data packets by another physical node of the separate physical nodes, using remote data memory access (RDMA).

Optionally, in any of the preceding aspects, another implementation of the aspect provides that the memory storage of the physical node includes one or more separate modules of code that are portions of instructions to operate as a service or a virtual network function on the batch of data packets and the memory storage of the other physical node includes one or more different separate modules of code that are portions of the instructions to operate as the service or the virtual network function on the batch of data packets.

Optionally, in any of the preceding aspects, a further implementation of the aspect provides that the one or more processors of the physical node execute instructions wherein the classification of each data packet of the batch, prior to being batched, includes insertion of information in a metadata area of each data packet, the information including data to identify a data path to reach a service end point or the virtual network function for each data packet.

Optionally, in any of the preceding aspects, a further implementation of the aspect provides that the information in each data packet of the batch includes: an identifier, generated locally in the system as part of the classification, corresponding to a packet destination of the data packet in the system and corresponding to the service or to the virtual network function running on the other physical node; or a policy identifier, generated locally in the system, to identify a path to process the data packet or portions of the path, the path including the service or the virtual network function on the other physical node.

Optionally, in any of the preceding aspects, a further implementation of the aspect provides that the one or more processors of the physical node execute instructions, after the batching, to process a data packet of the batch by the one or more different separate modules of code on the other physical node, with the processing of the data packet comprising: transmitting a reference of the data packet with a coded message to the other physical node; receiving a RDMA read request from the other physical node in response to transmitting the reference, and permitting reading of the data packet in response to the RDMA read request; and permitting an update of metadata of the data packet in the physical node, in response to a RDMA write request from the other physical node, the update corresponding to the data packet being processed by the one or more different separate modules of code on the other physical node.

Optionally, in any of the preceding aspects, a further implementation of the aspect provides that the one or more processors of the physical node execute instructions to move without involving a central processing unit (CPU), after the batching, the batch of data packets to the other physical node by an RDMA write.

Optionally, in any of the preceding aspects, a further implementation of the aspect provides that the one or more processors of the physical node execute instructions to operate the virtual network function or a component of the virtual network stored in the memory storage of the other physical node, by executing instructions to: hold the batch of data packets in the memory storage of the physical node, including all classified and updated metadata of the data packets, for access from the physical node by the other physical node; transfer, to the other physical node, access to a data packet of the batch or to the batch, including generating a signal to the other physical node as a request for a RDMA read operation by the physical node with respect to the data packet of the batch or the batch operated on in the other physical node; and store, in the memory storage of the physical node, results of the virtual network function or the component of a virtual network operating on the batch of data packets in the other physical node, with the storing using the RDMA operations.

Optionally, in any of the preceding aspects, a further implementation of the aspect provides that the system includes a controller to the separate physical nodes, the controller configured to identify a path for processing a data packet of the batch in the separate physical nodes.

According to one aspect of the present disclosure, there is provided a computer-implemented method for handling data packets, comprising: classifying, with one or more processors in a physical node of a plurality of physical nodes of a system, with each physical node of the plurality of physical nodes having one or more processors in communication with a memory storage in each physical node, each data packet of a set of data packets at the physical node; batching data packets of the set of data packets, forming a batch of data packets, based on the classification; and controlling access to the batch of data packets by another physical node of the separate physical nodes, using remote data memory access (RDMA).

Optionally, in any of the preceding aspects, another implementation of the aspect provides that the method includes operating a service or a virtual network function on the batch of data packets with the service or a virtual network function being a combination of separate modules of code with one or more separate modules of code in the memory storage of the physical node and one or more different separate modules of code in the memory storage of the other physical node.

Optionally, in any of the preceding aspects, a further implementation of the aspect provides that classifying each data packet includes inserting information in a metadata area of each data packet, the information including data to identify a data path to reach the service or the virtual network function for each data packet.

Optionally, in any of the preceding aspects, a further implementation of the aspect provides that the information in each data packet of the batch includes: an identifier, generated locally in the system as part of the classification, corresponding to a packet destination of the data packet in the system and corresponding to the service or to the virtual network function running on the other physical node; or a policy identifier, generated locally in the system, to identify a path to process the data packet or portions of the path, the path including the service or the virtual network function on the other physical node.

Optionally, in any of the preceding aspects, a further implementation of the aspect provides that the method includes wherein the method includes, after the batching, processing a data packet of the batch by the one or more different separate modules of code on the other physical node, with the processing of the data packet comprising: transmitting a reference of the data packet with a coded message to the other physical node; receiving a RDMA read request from the other physical node in response to transmitting the reference, and permitting reading of the data packet in response to the RDMA read request; and permitting an update of metadata of the data packet in the physical node, in response to a RDMA write request from the other physical node, the update corresponding to the data packet being processed by the one or more different separate modules of code on the other physical node.

Optionally, in any of the preceding aspects, a further implementation of the aspect provides that the method includes transmitting, after the batching, the batch of data packets to the other physical node by an RDMA write.

Optionally, in any of the preceding aspects, a further implementation of the aspect provides that the method includes operating the virtual network function or a component of the virtual network on batch of data packets including: holding a batch of data packets in the memory storage of the physical node, including all classified and updated metadata of the data packets, for access from the physical node by the other physical node; transferring, to the other physical node, access to a data packet of the batch or to the batch, including generating a signal to the other physical node as a request for a RDMA read operation by the physical node with respect to the data packet of the batch or the batch operated on in the other physical node; and storing, in the memory storage of the physical node, results of the virtual network function or the component of the virtual network operating on the batch of data packets in the other physical node, with the storing using the RDMA operations.

Optionally, in any of the preceding aspects, a further implementation of the aspect provides that the method includes using a controller to the separate physical nodes to identify a path for processing a data packet of the batch in the separate physical nodes.

According to one aspect of the present disclosure, there is provided a non-transitory computer-readable media storing computer instructions for handling data packets, that when executed by one or more processors, cause the one or more processors to perform the steps of: classifying, with the one or more processors in a physical node of a plurality of physical nodes of a system, with each physical node of the plurality having one or more processors in communication with a memory storage in each physical node, each data packet of a set of data packets at the physical node; batching data packets of the set of data packets, forming a batch of data packets, based on the classification; and controlling access to the batch of data packets by another physical node of the separate physical nodes, using remote data memory access (RDMA).

Optionally, in any of the preceding aspects, another implementation of the aspect provides that the steps include operating a service or a virtual network function on the batch of data packets with the service or a virtual network function being a combination of separate modules of code with one or more separate modules of code in the memory storage of the physical node and one or more different separate modules of code in the memory storage of the other physical node.

Optionally, in any of the preceding aspects, a further implementation of the aspect provides that classifying each data packet includes inserting information in a metadata area of each data packet, the information including data to identify a data path to reach the service or the virtual network function for each data packet.

Optionally, in any of the preceding aspects, a further implementation of the aspect provides that controlling access to the batch of data packets includes transmitting, after the batching, the batch of data packets to the other physical node by an RDMA write.

Any one of the foregoing examples may be combined with any one or more of the other foregoing examples to create a new embodiment within the scope of the present disclosure.

DETAILED DESCRIPTION

Figure 1:
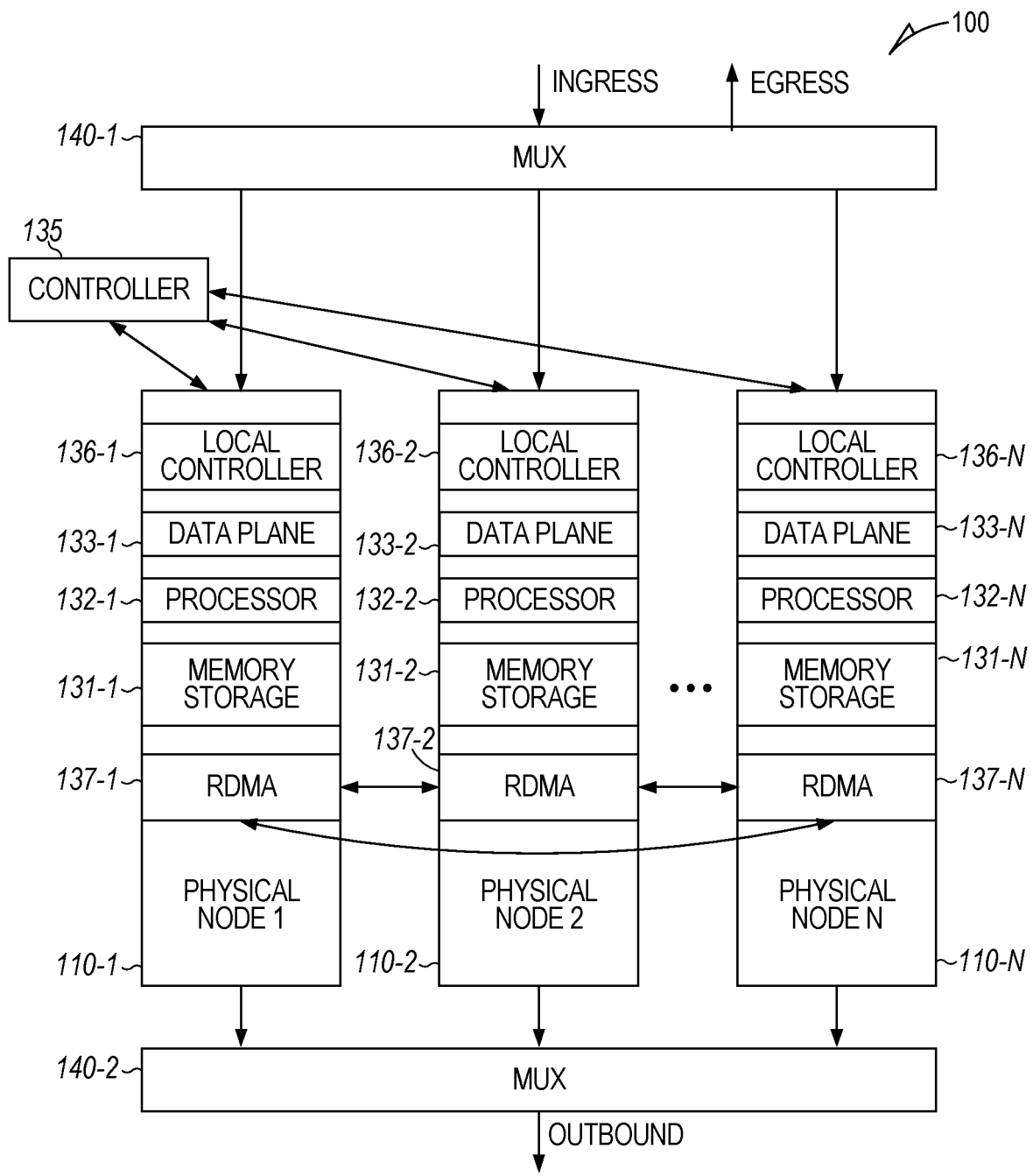
FIG. 1 is a block diagram of representation of a system having a number of separate physical nodes in which data packets are processed and transported, according to an example embodiment.

In the following description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that structural, logical and electrical changes may be made. The following description of example embodiments is, therefore, not to be taken in a limited sense.

The functions or algorithms described herein may be implemented in software in an embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Computer-readable non-transitory media includes all types of computer readable media, including magnetic storage media, optical storage media, and solid state storage media and specifically excludes signals. It should be understood that the software can be installed in and sold with the devices that handle event streams as taught herein. Alternatively, the software can be obtained and loaded into such devices, including obtaining the software via a disc medium or from any manner of network or distribution system, including, for example, from a server owned by the software creator or from a server not owned but used by the software creator. The software can be stored on a server for distribution over the Internet, for example.

In various embodiments, data packets in a physical node of a system can be batched into one of more batches and can be provided, using RDMA, to another physical node of the system for processing. The data packets can be received in the physical node originating from a network or from an application residing in memory storage of the physical node. The memory storage can include code for various applications of the system and instructions for handling data packets. One or more processors of the physical node can be in communication with the memory storage, where the one or more processors can execute the instructions to handle the data packets. Each data packet of a set of data packets, which can include received data packets from a network and from an internal application in the physical node, can be classified. Based on the classification, data packets of the set can be batched forming a batch of data packets. RDMA facilities of the physical node can be used to control access to the batch by another physical node of the system. The system can include multiple separate physical nodes, where each physical node includes memory storage having instructions to handle data packets within the respective physical node including control, using its RDMA facilities, of access of data packets with other physical nodes for processing the data packets.

In various embodiments, a module having software components in the physical node can be implemented to convert transfer operation of a batch of packets across physical nodes as memory input/output (I/O) operations across nodes. This module can be referred to as a RDMA tunnel end point (RTEP). A RTEP can be structured to work in conjunction with results of data packets being classified in the physical node and formed into one or more batches in the physical node. The classification of each data packet of the batch, prior to being batched, can include insertion of information in a metadata area of each data packet. In various embodiments, the RTEP module can use the information entered in a metadata area of the data packets being transferred. For example, a RTEP module associated with RDMA facilities of another physical node, as a second physical node separate from the physical node that classified and inserted data in a metadata area of a data packet, can examine the metadata area of the data packet in an RDMA operation to direct the data packet to processing to be performed with components of the second physical node. The use of the data in the metadata area of the data packet allows for avoidance of reclassifying the data packet in the second physical node.

In some embodiments, the data in the metadata area of a data packet can include, but is not limited to, an identifier generated locally in the physical node as part of the classification. The locally generated identifier can correspond to a packet destination of the data packet in the system on any physical node. The locally generated identifier can be a policy identifier, generated locally in the physical node as part of the classification, to identify a path to process the data packet or portions of the path, where the path includes traversing through a service or a virtual network function on the other physical node. Such a service or a virtual network function can be formed as one or more separate modules of code, in the memory storage of the physical node, that are portions of instructions to operate as the service or the virtual network function on a batch of data packets and one or more different separate modules of code, in the memory storage of the second physical node, that are other portions of the instructions to operate as the service or the virtual network function on the batch of data packets.

In some embodiments, services or virtual network functions can be structured as a combination of software components in a modular framework, where the components can be dynamically configurable in the modular framework. Locally generated identifiers can be assigned to data packets that are processed using such a modular framework. Representation of each data packet in a physical node can be enhanced with identifiers generated internal to the physical node and other physical nodes of a system can access it remotely. These local identifiers can include a port identifier (port_ID) or a policy identifier (policy_ID) assigned to each data packet for forwarding in the data plane. The port_ID and the policy_ID can be saved in a metadata area of the respective data packet.

In addition to a port_ID and a policy_ID, a data packet can be associated with a datapath identifier (datapath_ID) and a device identifier (device_ID) and a multicast_ID. The port_ID can be assigned to represent next destination of the packet within the local network. The port_ID can also be assigned as a port_ID of a virtual network function either in a chain or prior to exit from a component such as, but not limited to, a virtual private network (VPN), a firewall (FW), or an encapsulation like a virtual extensible LAN (VXLAN). The datapath_ID can be assigned to represent a local network path, where network functions in the local network path can be assigned a device_ID. A composition of a set of modules representing a service can be assigned a device_ID. The policy_ID can be assigned to correlate a data packet to a datapath for the data packet to take in processing through the local network or terminate locally. The datapath identifier can be maintained in a controller of the system. The datapath identifier can be associated with the generation of a datapath for processing data packets by services or virtual network functions defined by the set of modules of software code distributed between the physical node and the other physical node.

These locally generated identifiers (5 of them) can be used to forward a data packet at an ingress point in the system for forwarding to a destination within the system. By defining the four or five if multicast_ID needed, global identifiers, port_ID, datapath_ID, device_ID, and policy_ID, entities can be established locally for network functions and the forwarding plane. Using these identifiers along with the capability for selectively combining individual modules for different services, a path across a local system, such as but not limited to an edge cloud, can be created to establish connectivity to a cloud external to the system or other communication processing entity external to the system.

In various embodiments, a modular software framework is used to create building blocks of components from which network services can be assembled using an architecture similar to a micro-services architecture. An architecture arranged similar to a micro-service allows a network service to be composed of one or more modules that implement sub-functions utilized for a given service. For instance, a network switch can be realized by implementing each of an IP header parser, a protocol classifier, a media access control (MAC) lookup, and a repackage-header as modules. The protocol classifier module could also be used in other network functions, such as a firewall or implementation of access control lists (ACLs).

In various embodiments, network functions are mapped to sets of software modules and network connections to such network functions can be implemented as one or more API calls. Further, these modules can be assembled in a sequence or as a chain of modules on different paths. Such data structures are called directed acyclic graphs (DAG). In combination with processing within the modules and the DAG, the data structure can allow for the execution of the network function or execution of forwarding plane logic using a least amount of CPU instructions. Use of a modular framework can provide for optimization of resource management. A modular framework using atomic functions and custom internal network identifiers, for example, can provide an efficient network processing to forward data packets.

A modular framework referenced here is one that allows creation of small executable modules of code that can run, interact, and exchange data in a specified runtime environment. Examples of such modular frameworks that can be used as a starting framework are vector packet processing (VPP), Berkeley Extensible Software Switch (BESS), Click, and other processing entities. Click is a modular framework for routers. These frameworks provide an execution mechanism that can instantiate small code modules and can be programmed to work as a super-module, meaning, with additional code, the modules can be made to work together exchanging data.

Another advantage of modular architecture is that a set of atomic functions can be implemented as modules. For instance, sub-functions can be implemented such that, when segmentation/de-segmentation of jumbo packets are implemented as a module, the module can perform the same operation in software or offload it to hardware if supported. Software modules can be implemented in the same manner with sequencing operation, such as explicit congestion notification (ECN) or class of service (CoS) flow control for priority-based flow control (PFC) and many other operations. This not only allows for commodity hardware to be used in leveraging software, but it can provide leverage for enhanced performance, when proper hardware is available. In various embodiments, data packets can logically flow between software modules situated between ingress and egress for processing, even though physically the data packet can be stationary at one memory location, where all modules access the data packet directly using the same memory pointer.

A modular framework allows packet processing to be performed in a number of different ways. As an example, in one approach, data packets are processed sequentially from start to finish across all modules. A classify module can examine parsed information in the metadata of a data packet from a header parser that is a previous module in a processing path. Depending on results of the classifier operation placing information in the metadata of the data packet, a connection switch, for example, can arbitrate the data packet to go to one of several local containers or VMs, as a local destination, or to be encrypted, encapsulated and/or simply sent to a NIC to reach an outside destination. Each atomic operation can be created as a module.

In another approach with respect to the above example, a queue module can be inserted between the classifier and the connection switch. If a decision is made to change how to do packet scheduling, batching can be conducted in a different order at the queue module and local traffic to the local container can be prioritized over the traffic going over the wire from the NIC. A simple change in how to use modules can provide flexibility creating better scheduling algorithms. Operating in a modular framework can be used in network scheduler algorithms such as multi-resource fair queuing, weighted fair queuing (WFQ), deficit round robin (DRR), and start-time fair queuing (SFQ), and other algorithms.

Packet transfers, as taught herein, may be performed as memory read/write operations in user space and not hit kernel to user space memory transfer overheads with multiple data transfers. A modular architecture with additional information placed in the metadata area of data packets is able to use zero-copy scheme, meaning that block of memory does not get transferred during packet processing. For example, a zero-copy scheme can be used in a modular architecture while also utilizing local identifiers by not adhering to standard protocols for networking within an edge cloud. A modular architecture with local identifiers within a forwarding plane can use an internal scheme of identifying packets and tagging with internal IDs. One can also develop a scheme for datapath abstracting equivalent of a network or subnet in traditional networking schemes. This allows creation of a network path as a simple API call without passing packet data (no copying) but rather transition to next software module. The same reference pointer can be used that the previous module used. In this way, this scheme can reduce latencies and policy implementations very effectively.

Modules can be dynamically composed in the control plane based on user criteria for processing data packets that are being forwarded to an exterior network or terminating locally. One or more of the dynamically composed modules may be virtual network functions. Any number of virtual network functions and forwarding logic can be created with reusable components provided by a modular framework and information regarding data packets, for example, internal representations for data packets and the system network. Some dynamically composed modules can perform one or more lookup operations and switch a data packet to its appropriate port that acts as an end-point destination in the system network. Some can determine if packets can flow from one datapath, which is a network path, to another, thereby creating a router-like function. Many other functions can be created using modules in a modular framework tied to internal generation of identifiers for each data packet in a forwarding plane.

In various embodiments, network transport of data packets can include network transfer at a transfer location without using a local CPU such that every network transfer can be approached as a function call with shared memory access, using remote read or write from other nodes and also using a modular framework in conjunction with internally generated representations of data packets. The application of internally generated IDs, used to traverse a DAG of software modules as nodes in the graph, reduces latencies within a physical location, while also using RDMA to read/write batches of packets across nodes to further reduce inter-node latencies. This technology can reduce inter-node latency values to be close to the latencies between services running within a node.

With a modular framework with a Poll-Mode Drivers, the manner in which packets traverse the network can be designed as memory read/writes rather than moving the packets around through a network stack. Using this design, the number of CPU cycles needed to move data or process a packet by a VNF, implemented using a micro-services architecture with DAG, reduces by order of magnitude. Hence, the latency can be reduced by a significant margin. It can be superior to data link layer approaches, such as with IPoIB or VMA. In conventional systems, batching is conducted only within a physical node such as with vector packet processing (VPP) or BESS or NetBricks, while between physical nodes the packets are transferred as network data transfers.

In various embodiments, a module, which converts transfer operation of a batch of packets across physical nodes as memory input/output (I/O) operations across nodes, is built in a modular framework. This module can be referred to as a RTEP module. The RTEP module can use one or more identifiers entered in a metadata area of the data packets being transferred. With VNFs structured as a set of one or more sub-modules along DAG within a physical node or across physical nodes, there can be additional information associated with the data packet, based on processing on the originating node conducted prior to the transfer. In RTEP, an entire batch can be transferred by a remote read operation using RDMA along with the metadata in the data packets of the batch, so that services such as micro-services based VNF can span services across physical nodes. Overall, use of RTEP with local assigned identifiers and DAG modules, for example, results in delays close to those of delays of service within a physical node, because RDMA performs remote read or write without overheads of TCP/IP networking protocols or CPU involvements.

This approach is different from VXLAN tunnel end point (VTEP). In VTEP, a virtual network instance (VNI) is used in encapsulated header to denote a L2 network, and, on the remote end, encapsulated header is translated back to the network mapped to the VNI. Layer 2 is equivalent to the link layer, which is the lowest layer in the TCP/IP network model. Layer 2 is the network layer used to transfer data between adjacent network nodes in a wide area network or between nodes on the same local area network. This conventional application of a tunnel end-point does not benefit from RDMA capabilities and transferring additional metadata items used in RTEP.

In a conventional micro-services architecture, information exchange is performed by invoking an API across micro-services or using a message bus. The data exchange happens as function arguments, parameters exchanged using a key-value store, also referred to as a key-value database, or sent as message in message bus. All of these methods incur excessive I/O delays, because the I/O involve calling an API function across processes resulting in remote procedure calls (RPC) and, when invoked across physical nodes, it incurs delays contributed by the TCP/IP network protocols and driver stack.

In a conventional micro-services architecture, API calls between two micro-services can have a number of function calls. Each function call will be an RPC call that would use either a socket based communication, use messaging framework, or named pipes in a Linux-like operating systems. All these mechanisms copy the data from one location to another and in case of socket based communication, the data gets transferred between user space and kernel space. For two functions with one function in one physical node and the other function in another physical node, the two functions are remote procedure calls across nodes.

Typically, a call across nodes is implemented as a socket based API call or use a messaging framework. In both the cases, the packet is copied between user space and kernel space on each node, then the same copy is again made on the remote node. The memory copy injects delays in moving data between kernel and user space in all those schemes. These are significant considering that many API calls occur between sub-modules in micro-services architecture. For instance, kernel to user space exchange delays are in the order of hundreds of nanoseconds or at times even a microsecond. Memory copies take 70 to 300 nanoseconds. When passing through Ethernet, the delays are on the order of 20 to 30 micro-seconds. With about ten API exchanges between modules, each module also having its own processing using CPU cycles, the delays easily start to grow into hundreds of micro-seconds. As a result, the target of one millisecond roundtrip latency becomes challenging with such schemes, and few VNFs, if any at all, could be supported. By reducing inter-node-micro-service latency closer to what would be within a node, about 5 micro-seconds, a multi fold reduction in latencies can be attained. Even at 9 micro-second inter-node delay, one can benefit 3 times reduction in latency while everything else remaining constant.

One improvement with modern frameworks like DPDK is that the data packet can be fetched directly from a NIC buffer to the user space, bypassing the kernel. Frameworks, such as BESS, have provisions in which a single copy of a data packet is held until it has to move out of the node. Zero-copy packet processing is achieved by many technologies available today such as Open vSwitch (OVS) with DPDK, a Contrail switch with DPDK, BESS, and VPP. With DPDK, all these network data plane implementations improve the throughput by order of magnitude, and the latencies within a node are improved significantly as well. However, all these technologies fail to improve the latencies across nodes, because there are protocol and propagation delays when using an IP based network. The transport layer (Layer 4) such as TCP contributes to flow control delays.

Currently, the inter-node latencies with TCP/IP based systems is at best about 25 to 30 microseconds using VPP, BESS, or even more in case of OVS with DPDK. These approaches are certainly useful for some applications and also it is possible to achieve 1 millisecond latency budget for IoT/5G, but these approaches aren't able to run a number of desired VNFs at these latencies nor can they distribute micro-services across nodes. In various embodiments, a modular framework in conjunction with internally generated representations of data packets can be a platform on which a memory copy or memory read using RDMA can be implemented. Such a platform can support more VNFs and still satisfy a less than 1 ms roundtrip latency criterion.

Another possibility to reduce latencies uses protocols such as IPoIB. Infiniband is a superior interconnect technology for low latency. Application of IPoIB uses some form of Infiniband link layer. One drawback with this approach is that the Infiniband management is left to the system administrator, which is not simple and quite expensive. With these being the main form of interconnect between hosts, the interconnect can be fairly complex to manage.

In various embodiments, InfiniBand technology with reusable modules can be used to transfer a bunch of packets to reduce latency and increase throughput. In this approach, the system admin is only required to configure one interconnect over InfiniBand per server in the cluster and its usage is such that most management tasks can be automated. No special configurations needed as with the case of IPoIB. The management task is much simpler and easily interchangeable, since various RDMA technologies are available.

FIG. 1 is a block diagram of representation of a system 100 having a number of separate physical nodes 110-1, 110-2 . . . 110-N in which data packets are processed and transported. The separate physical nodes 110-1, 110-2 . . . 110-N are apparatus locally deployed in system 100. Physical nodes 110-1, 110-2 . . . 110-N include memory storages 131-1, 131-2 . . . 131-N, respectively, and processors 132-1, 132-3 . . . 132-N, respectively. Processors 132-1, 132-3 . . . 132-N are in communication with memory storages 131-1, 131-2 . . . 131-N, respectively, and can execute the instructions of its associated memory storage.

Data packets are ingress to system 100 to equipment that can distribute the data packets to appropriate physical nodes 110-1, 110-2 . . . 110-N. For example, system 100 can include a mux 140-1 that sends packets to all nodes or alternately, 140-1 can be a top of the rack (TOR) switch that selects to which node the packet would go to. In an embodiment, for a multiplexer, for example mux 140-1, all nodes that do not have a port_ID assigned locally for a packet will drop the packet. A node with the locally assigned port_ID may have to send the packet next to other VNFs along a graph path that can be across nodes. If at any node, the final VNF completes the processing of the packet, and, if it is determined that the packet needs to reach an external destination, all metadata and other information generated for local processing of the packet can be removed, the packet can be encapsulated if needed, and the packet can be sent to an egress port connected to external multiplexer. If there is a service locally for a packet, that service can flip source and destination IP addresses in the packet and send it back to mux 140-1 from where it was obtained.

Each individual physical node 110-1, 110-2 . . . and 110-N can process the data packets that it receives from mux 140-1 and send the processed data packets back to mux 140-1 for services running within system 100, or alternately to mux 140-2 if the packet is for distribution to network facilities for transport on a network external to system 100. Mux 140-1 and mux 140-2 may be structured as an integrated unit. Each of mux 140-1 and mux 140-2 can include NICs for the data packets. The processors in each separate physical node 110-1, 110-2 . . . 110-N can operate with their associated storage memory to form sets of software modules to provide services or VNFs, generate local identifiers to represent the data packets, operate as a classifier, operate as a batch manager, and operate as other modularized functions in manner similar to the methods and systems associated with FIGS. 1-8.

Processors 132-1, 132-2 . . . 132-N can execute instructions in memory storages 131-1, 131-2 . . . 131-N, respectively, to operate services or VNFs on data packets received in associated physical nodes 110-1, 110-2 . . . 110-N, where the services or VNFs are structured as software modules distributed among two or more of the physical nodes 110-1, 110-2 . . . 110-N. For example, consider a set of data packets received in physical node 110-1 as the original physical node in which the data packets are received in system 100. The data packets are classified in physical node 110-1. In an embodiment, information regarding a data packet can be realized by using a port_ID, a policy_ID, or both a port_ID and policy_ID, which can be stored in each data packet of the set by operations of the classifier. Similar classifiers can operate in the other physical nodes 110-2 . . . 110-N. A process flow of the data packets classified in physical node 110-1 can include operations in software modules in one of more of physical nodes 110-2 . . . 110-N without reclassifying the data packets in these other physical nodes, if passed through RTEP.

System 100 can also include a controller 135 that manages creating a DAG within a node or across nodes 110-1, 110-2 . . . 110-N in a control/data plane for the forwarding functions of the physical nodes 110-1, 110-2 . . . 110-N. Controller 135 can configure local controllers 136-1, 136-2 . . . 136-N in physical nodes 110-1, 110-2 . . . 110-N, respectively, that configure data planes 133-1, 133-2 . . . 133-N, respectively, with appropriate DAGs for each of the data planes. Controller 135 can operate in the generation of datapaths with corresponding datapath_IDs, which are maintained in controller 135 and controllers in 110-1, 110-2, . . . 110-N. Controller 135 can operate in generation of device_ID for each VNF created in nodes 110-1, 110-2 . . . 110-N. Controller 135 can configure with physical nodes 110-1, 110-2 . . . 110-N to provide tables associated with the local identifiers for the process flow of data packets in system 100. The datapaths for particular data packets may include services or VNFs with some modules on one of the physical nodes and other modules on one or more of the other physical nodes. A data packet in one of the physical nodes can include operations on the data packet by a module in another physical node based on a port_ID or policy_ID stored in as metadata in the data packet in accordance with a datapath_ID. Tables in each of the physical nodes 110-1, 110-2 . . . 110-N can provide an effective mapping of the port_ID or policy_ID with the datapath_ID and device_ID.

Processors 132-1, 132-3 . . . 132-N can execute instructions in memory storages 131-1, 131-2 . . . 131-N, respectively, to operate a software module as a RTEP to perform a transfer between selected physical nodes 110-2 . . . 110-N corresponding to the datapath for the data packets received in an individual physical node. The RTEP in each of physical nodes 110-2 . . . 110-N can operate with RDMA facilities 137-1, 137-2 . . . 137-N, respectively, to perform the appropriate transfer. For example, after data packets received in physical node 110-1 are classified, a batch manager module in in physical node 110-1 can batch one or more data packets for transfer to one or more of physical nodes 110-2 ... 110-N, where the batching can be conducted on a per datapath_ID basis. The RTEP module of physical node 110-1 can operate with the appropriate physical nodes 110-2 ... 110-N to execute a process flow for the batch across the multiple nodes according to the assigned datapath_ID. The classification may be conducted only in the original receiving physical node, such that the recipient physical node in the RTEP transfer uses the identifiers in the metadata of the data packets in the process flow among the physical nodes 110-1, 110-2 ... 110-N.

Processors 132-1, 132-3 ... 132-N and memory storages. 131-1, 131-2 ... 131-N may be structured to include similar capabilities in each of physical nodes 110-1, 110-2 ... 110-N. Each processor, which can be realized as one or more processors, can execute instructions of its associated memory storage, with respect to received data packets, to: classify each data packet of a set of data packets at the physical node; batch data packets of the set of data packets, forming a batch of data packets, based on the classification; and control access to the batch of data packets by another physical node of the separate physical nodes, using RDMA.

The memory storage of the respective physical node can include one or more separate modules of code that are portions of instructions to operate as a service or a virtual network function on the one or more data packets and the memory storage of the other physical node can include one or more different separate modules of code that are portions of the instructions to operate as the service or the virtual network function on the one or more data packets.

The one or more processors of the respective physical node can perform a number of different functions, either individually in combination of with other functions. The one or more processors of the respective physical node can execute instructions to classify each data packet of the batch, prior to being batched, including insertion of information in a metadata area of each data packet, the information including data to identify a data path leading to the service or the virtual network function for each data packet. The information in each data packet of the batch can include: an identifier, generated locally in the system as part of the classification, corresponding to a packet destination of the data packet in the system and corresponding to the service or to the virtual network function running on the other physical node; or a policy identifier, generated locally in the system, to identify a path to process the data packet or portions of the path, the path including the service or the virtual network function on the other physical node.

The one or more processors of the physical node can execute instructions, after the batching, to process a data packet of the one or more data packets by the one or more different separate modules of code on the other physical node, with the processing of the data packet comprising: transmitting a reference of the data packet with a coded message to the other physical node; receiving a RDMA read request from the other physical node in response to transmitting the reference and permitting reading of the data packet in response to the RDMA read request; and permitting an update of metadata of the data packet in the physical node in response to a RDMA write request from the other physical node, the update corresponding to the data packet being processed by the one or more different separate modules of code on the other physical node. The one or more processors of the physical node can execute instructions to transmit, after the batching, the one or more data packets to the other physical node by an RDMA write.

The one or more processors of the physical node can execute instructions to operate a virtual network function or a component of a virtual network stored in the memory storage of the other physical node, by executing instructions to: hold the batch of data packets in the memory storage of the physical node, including all classified and updated metadata of the data packets, for access from the physical node by the other physical node; transfer, to the other physical node, access to a data packet of the batch or to the batch, including generating a signal to the other physical node as a request for a RDMA read operation by the physical node with respect to the data packet of the batch or the batch operated on in the other physical node; and store, in the memory storage of the physical node, results of the virtual network function or the component of a virtual network operating on the batch of data packets in the other physical node, with the storing using the RDMA operations.

System 100 can include controller 135 to the separate the physical nodes 110-1, 110-2 ... 110-N. For a system generating local identifiers, the assigned local identifiers in these nodes can include, for each data packet in a given physical node, a port identifier corresponding to a packet destination of each data packet and a datapath identifier, with the datapath identifier used in controller 135 of system 100 to identify a processing path in the separate physical nodes 110-1, 110-2 ... 110-N for one or more of the data packets.

In various embodiments, RDMA technologies are used to achieve zero-copy across nodes using modular framework for extensibility in conjunction with an internal representation of data packets, modular DAG, etc. With batch transfer of data packets, improved latencies and throughput can be attained. A bulk of packets can be transferred by memory copy rather than sequential stream of packets as in traditional networking. This significantly increases performance of VNFs when implemented as micro-services, which has the potential to run more VNFs at a network edge at a one millisecond RTT latency criterion for IoT.

An RTEP module can facilitate packet transfer between nodes by moving a bunch of data packets, referred to as a batch, using RDMA on a modular platform in which the data packets are provided a local internal representation. This mechanism provides for runtime forward processing using the local internal representation.

When a batch is transferred by a source node RTEP, the destination node RTEP effectively wakes up and inspects the metadata of a data packet of the batch, where the metadata of the data packet can have information regarding processing of the data packet, such as but not limited to one or more local internal IDs. The destination node RTEP can redirect the data packets of the batch using software modules in conjunction with the information in the metadata area of the data packets. In various embodiments, datapaths and their port_ID associations can be well defined, so packets traverse to a destination unambiguously through graph nodes and virtual switches built for optimization in a single node. A remote read can be performed instead of transferring all data to destination node for a batch of packets returning to the same node after a micro-service completes processing.

In various embodiments, a modular framework can be used to develop VNFs. Data packets received in a physical node are batched to process, that is, when data packets arrive, they are batched together to be processed by one or more sub-functions between ingress and egress with respect to a network data plane. Each sub-function implemented as software modules operate on the batch of data packets at a shared memory location. When a data packet is to be transferred to a remote node for processing by a sub-function of the VNF on that remote node, or if the next VNF in a chain of VNFs on the remote node, the transfer can be facilitated in a number of different options. A first option includes sending a reference of the data with a coded message from the originating node to the remote node. The remote node function can initiate a RDMA read-request. The packet information is read remotely and metadata in the data packet is updated as a RDMA write request. When read occurs, only few header fields are read, which results in large latency gains (reduction in latency).

A second option can include sending the entire batch by a RDMA write to the remote node. This option may be conducted as an implementation choice if there is no more processing on the originating node, Node A for example, and the data is bound to an egress pipeline from the remote node, Node B for example. Since no further processing is to be conducted in Node A and egress is from Node B, then the entire batch can be transferred to Node B, then transfer the batch to Node B.

With the sub-functions for a VNF located on three separate physical nodes, Node a, Node B, and Node C for example, the above options can be applied to a batch originally received and classified in Node A. For example, if the batch was transferred to Node B, and if a subsequent sub-function is on Node C, a RDMA read and a RDMA write can be conducted or the batch can be transferred from Node B to Node C.

Figure 2:
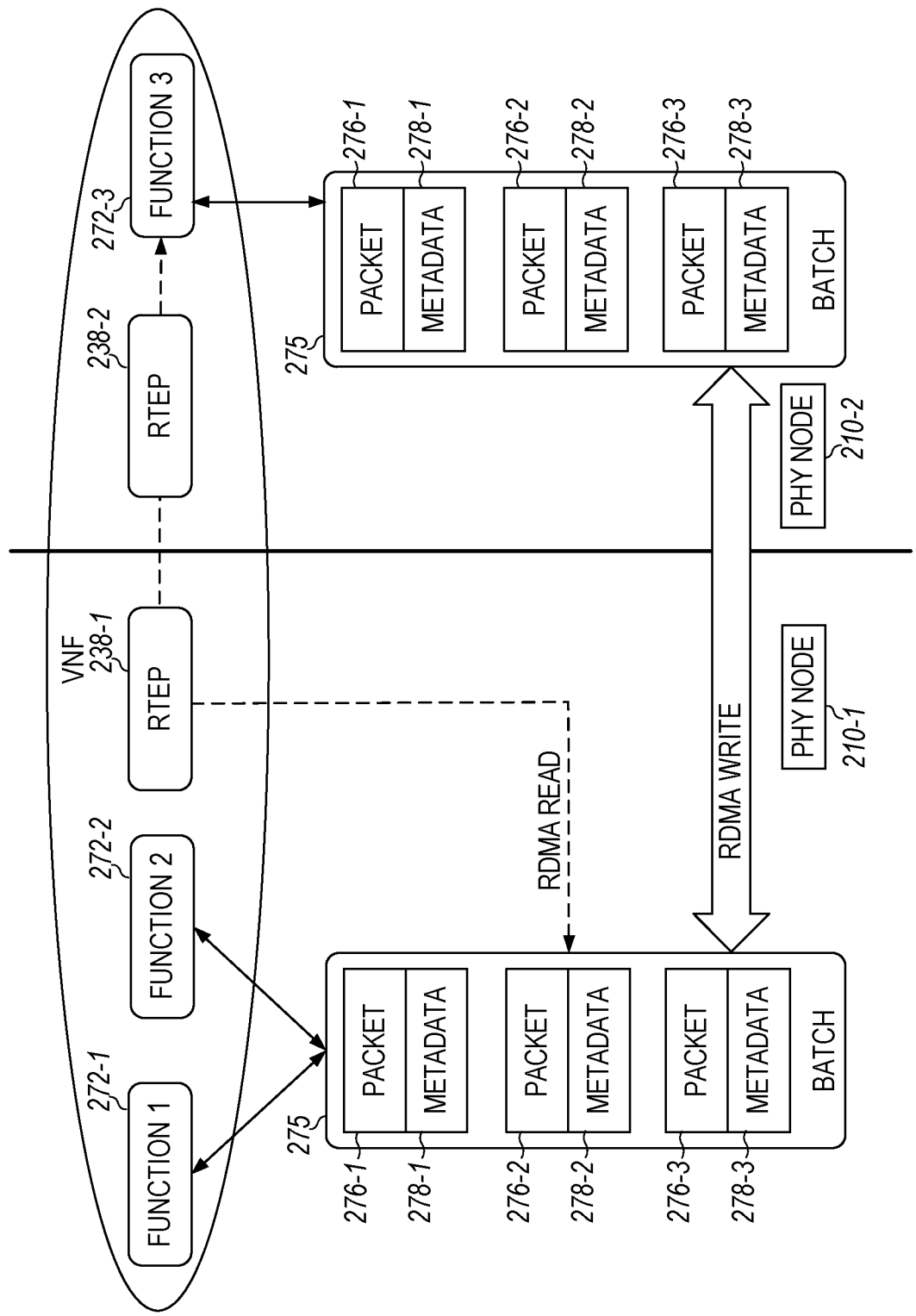
FIG. 2 is representation of a virtual network function having modular components in two different physical nodes, according to an example embodiment.

FIG. 2 is representation of a VNF 271 having modular components in two different physical nodes 210-1 and 210-2. In this case, it is assumed that physical node 210-1 is an originating node for operation of VNF 271 on a batch 275 of data packets. Batch 275 includes, but is not limited to, packets 276-1, 276-2, and 276-3 having metadata areas 278-1, 278-2, and 278-3, respectively. VNF 271 includes function (1) 272-1 and function (2) 272-2 in physical node 210-1 and function (3) 272-3 in physical node 210-2. Since VNF 271 has components that operate on batch 275 in both physical nodes, RTEP modules can be used to provide operations of function (3) 272-3 on the data packets of batch 275. RTEP 238-1 is in physical node 210-1 and RTEP 238-2 is in physical node 210-2.

VNF 271 can operate on data packets 276-1, 276-2, and 276-3 in physical node 210-1 first with function 272-1 and function 272-2 and then with function 272-3 in physical node 210-2. Function 272-1 can operate on a data packet of batch 275 with results of the operation stored in the metadata area of the data packet, followed by function 272-2 operating on the data packet of batch 275 with results of the function 272-2 operation stored in the metadata area of the data packet. RTEP 238-1 in physical node 210-1 can be activated to engage in a RDMA read in conjunction with RTEP 238-2 in physical node 210-2 to provide for function 272-3 to operate on the data packet. If the data packet is to be in physical node 210-1 after operation by VNF 271, a RDMA write can be conducted.

In an embodiment, information, for example a port_ID, of a data packet remains in the metadata of a data packet for the next node to which the process flow of the data packet is destined. The batch transfer is conducted to a remote node and the module which is the destination for the data packet is provided with (or notified of) the packet location to perform action on the data packet. For a remote read, a remote read of the packet metadata can be performed instead of the whole packet data. When the destination module tries to access the shared memory location pointed to by the information (for example a local identifier in the metadata of the data packet), operations can be performed from processor execution of a runtime software module that would conduct a remote read and perform the associated RDMA read.

A remote read is quite useful if the packets are large. The batch size can be controlled such that it is not too large to avoid waiting to complete a batch. Increasing batch size increases latency. A controller, such as controller 735, can determine the batch size. For example, the batch size can be from 20 to 100 packets. Batch sizes less than 20 packets or greater than 100 packets can be used if packets are too large or too small respectively. The effects of batch size are magnified when the packet size, as a maximum transmission unit (MTU) is 500 or more bytes as opposed to small 64 byte packets. With larger byte packets, there may be a many fold increase in write time as compared to read time. The decision to use a remote read or write can be an option to the controller. The configuration to read or write can be changeable dynamically in the controller.

Figure 3:
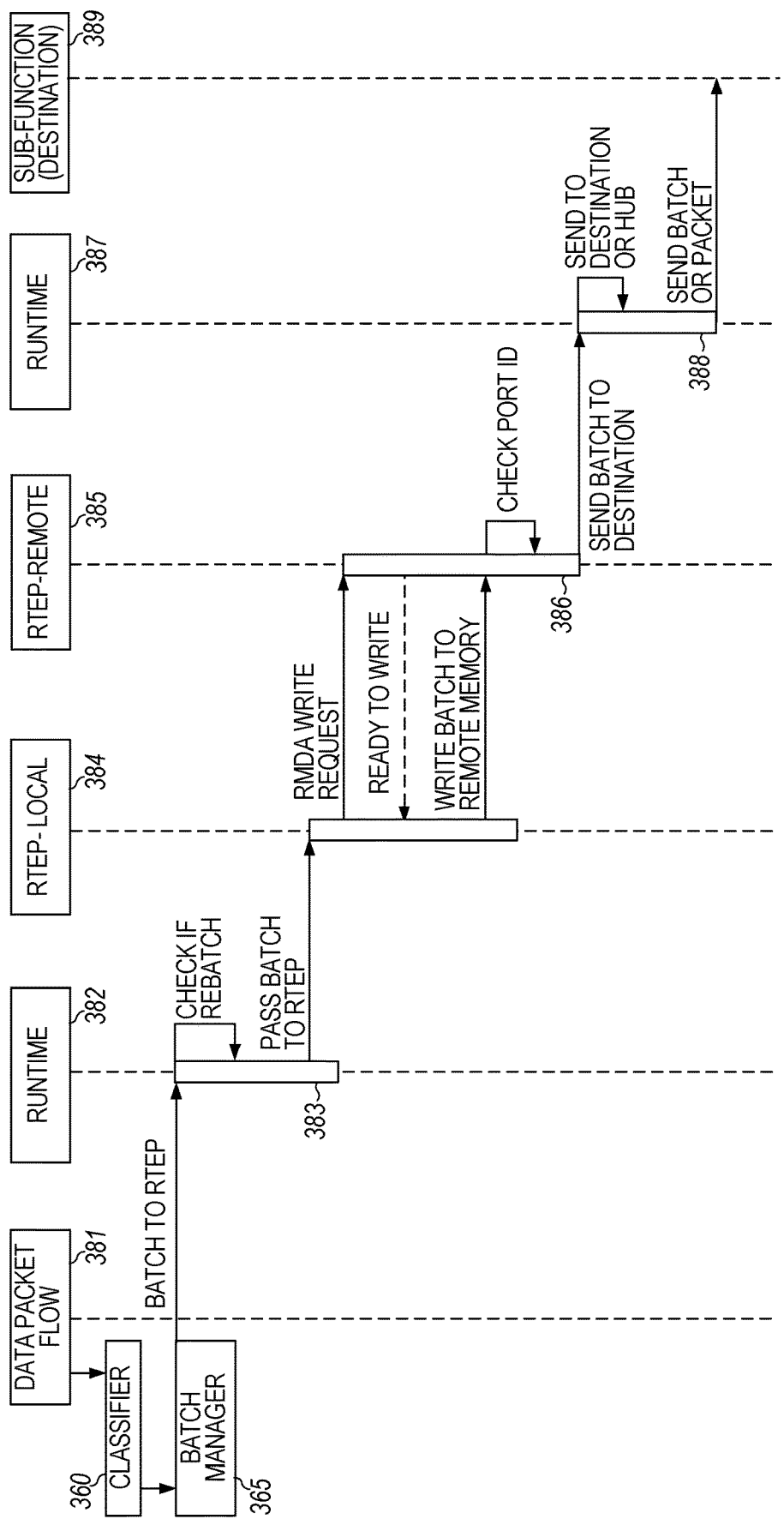
FIG. 3 is an illustration of a remote write sequence, according to an example embodiment.

FIG. 3 is an illustration of a remote write sequence in a system that generates local identifiers for data packets. At 381, a flow of data packets is received. The data packets are classified by a classifier 360, which is a software module. One or more of the data packets are batched by a batch manager 365 and provided for RTEP operation to a runtime module at 382. At 382, the data packets of the batch are checked to determine if all the data packets of the batch have the same datapath_ID. If not, the data packets are re-batched so that the new batch includes only data packets with the same datapath_ID. Once all the data packets in a batch have the same datapath_ID, the batch is passed to the local RTEP at 384. The local RTEP engages with the remote RTEP at 385 by sending a RDMA write request. The remote RTEP responds with a ready to write signal. In response to the ready to write signal, the local RTEP writes the batch to the remote memory. For each data packet of the transferred batch, the remote RTEP checks the port_ID of the data packet at 386. Identification of the port_IDs of the batch at the remote node in view of the tables at the remote node allows the batch to be sent to the destination in the remote node in conjunction with a runtime module in the remote node at 387. At 388, the data packets of the batch are sent to its destination or a hub/switch connecting to the destination. A data packet of the batch or the entire batch can be sent to the destination at 389, which may be a sub-function to operate on the data packets of the batch.

Figure 4:
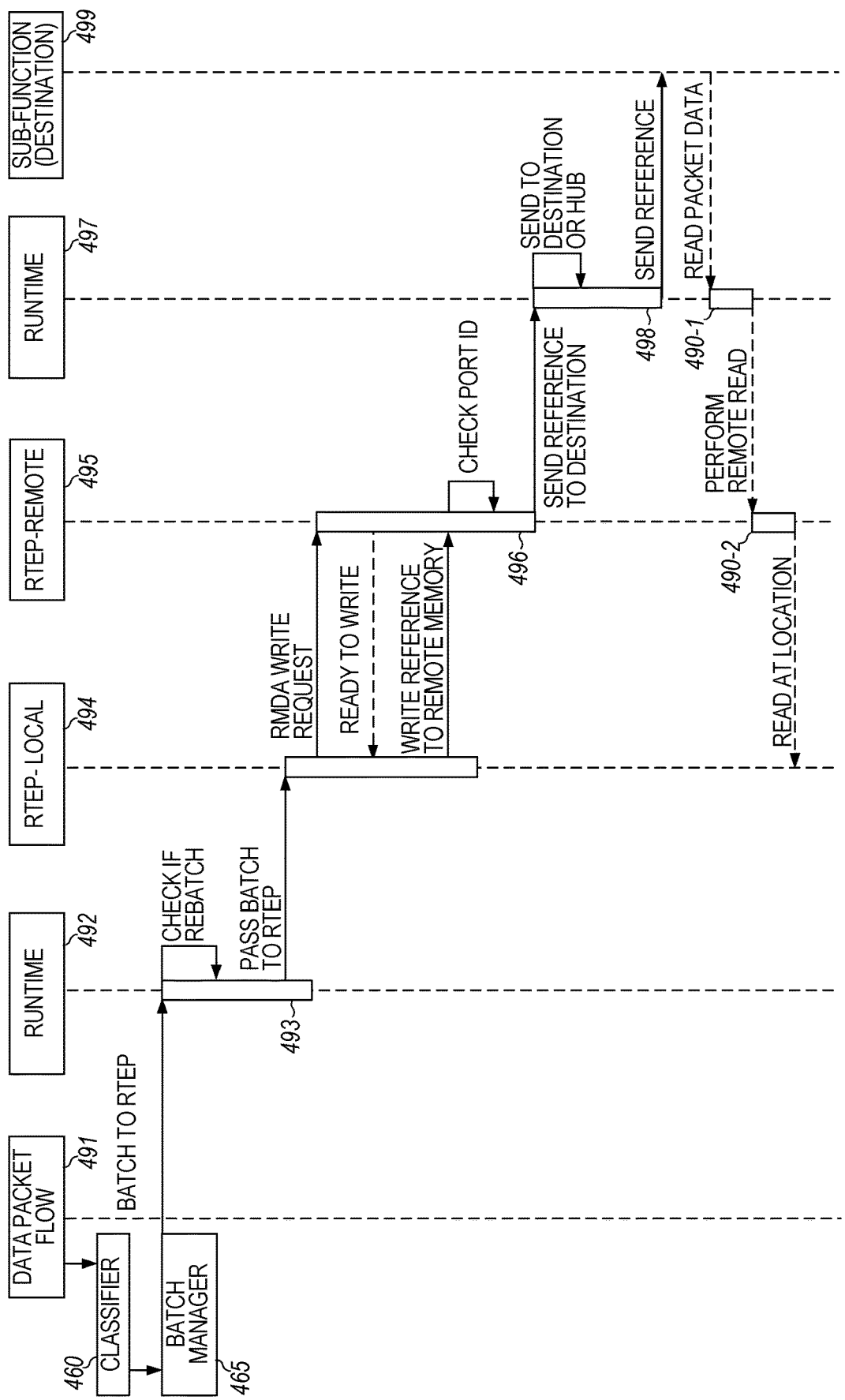
FIG. 4 is an illustration of a remote read sequence, according to an example embodiment.

FIG. 4 is an illustration of a remote read sequence in a system that generates local identifiers for data packets. At 491, a flow of data packets is received. The data packets are classified by a classifier 460, which is a software module. One or more of the data packets are batched by a batch manager 465 and provided for RTEP operation to a runtime module at 492. At 493, the data packets of the batch are checked to determine if all the data packets of the batch have the same datapath_ID. If not, the data packets are re-batched so that the new batch includes only data packets with the same datapath_ID. Once all the data packets in a batch have the same datapath_ID, the batch is passed to the local RTEP at 494. The local RTEP engages with the remote RTEP at 495 by sending a RDMA write request. The remote RTEP responds with a ready to write signal. In response to the ready to write signal, rather than sending the entire batch, a small data structure that references location at remote node can be sent. The data structure can have a security token and location address that at runtime can translate as remote read operation, one for each packet in the batch. When each reference is accessed from remote node, the runtime action (using RTEP) will perform remote read.

For each data packet of the transferred batch, the remote RTEP checks the port_ID of the data packet at 496. Identification of the port_IDs of the batch at the remote node in view of the tables at the remote node allows the batch to be sent to the destination in the remote node in conjunction with a runtime module in the remote node at 497. At 498, the data packets of the batch are sent to its destination or a hub/switch connecting to the destination. A data packet of the batch or the entire batch can be sent to the destination at 499, which may be a sub-function to operate on the data packets of the batch. A read packet data operation is sent back to runtime module, at 490-1, from which the remote RTEP is instructed to perform a remote read. The remote RTEP performs a read at its location in conjunction with the local RTEP at 490-2.

Figure 5:
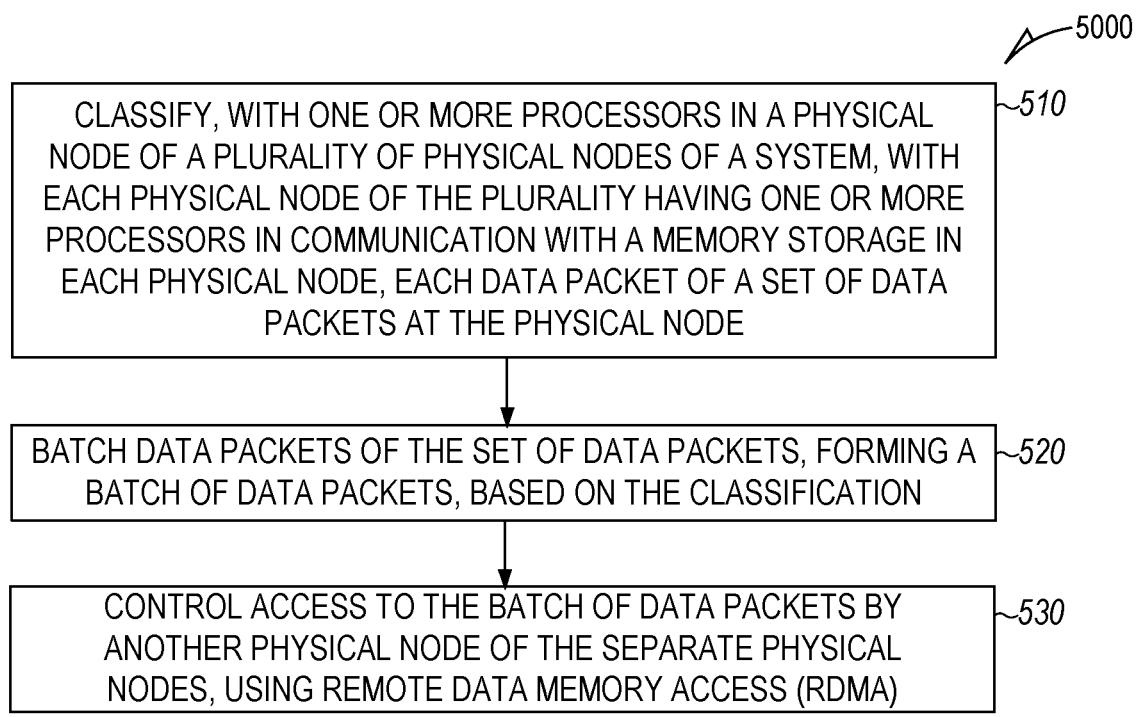
FIG. 5 is a flow diagram of features of an example method for handling data packets, according to an example embodiment.

FIG. 5 is a flow diagram of features of an embodiment of an example method 500 for handling data packets. The method can be realized by one or more processors executing instruction stored in memory storage of a physical node of a system. At 510, each data packet of a set of data packets at the physical node is classified, with one or more processors in a physical node of a plurality of physical nodes of a system, with each physical node of the plurality having one or more processors in communication with a memory storage in each physical node. The set of data packets can include data packets received at the physical node from a network or from one or more applications stored on the physical node. Classifying each data packet can include inserting information in a metadata area of each data packet, the information including data to identify a mapping of the service or the virtual network function to the data packet. The information in each data packet of the batch can include an identifier generated locally in the system as part of the classification. The identifier can be an identifier that corresponds to a packet destination of the data packet in the system and corresponds to the service or to the virtual network function running on the other physical node. The identifier can be a policy identifier, generated locally in the system, to identify a path to process the data packet or portions of the path. The path can include the service or the virtual network function on the other physical node.

At 520, batching data packets of the set of data packets are batched, forming a batch of data packets, based on the classification. At 530, controlling access to the batch of data packets by another physical node of the separate physical nodes is controlled, using RDMA. A controller to the separate physical nodes can be used to identify a path for processing a data packet of the batch in the separate physical nodes.

Variations of method 500 or methods similar to method 500 can include a number of different embodiments that may be combined depending on the application of such methods and/or the architecture of systems in which such methods are implemented. Such methods can include operating a service or a virtual network function on the batch of data packets with the service or a virtual network function being a combination of separate modules of code with one or more separate modules of code in the memory storage of the physical node and one or more different separate modules of code in the memory storage of the other physical node.

Such variations of method 500 or methods similar to method 500 can include, after the batching, processing a data packet of the batch by the one or more different separate modules of code on the other physical node, with the processing of the data packet comprising: transmitting a reference of the data packet with a coded message to the other physical node; receiving a RDMA read request from the other physical node in response to transmitting the reference and permitting reading of the data packet in response to the RDMA read request; and permitting an update of metadata of the data packet in the physical node, in response to a RDMA write request from the other physical node, the update corresponding to the data packet being processed by the one or more different separate modules of code on the other physical node. Such variations of method 500 or methods similar to method 500 can include transmitting, after the batching, the batch of data packets to the other physical node by an RDMA write.

Variations of method 500 or methods similar to method 500 can include operating the virtual network function or a component of the virtual network on batch of data packets including: holding a batch of data packets in the memory storage of the physical node, including all classified and updated metadata of the data packets, for access from the physical node by the other physical node; transferring, to the other physical node, access to a data packet of the batch or to the batch, including generating a signal to the other physical node as a request for a RDMA read operation by the physical node with respect to the data packet of the batch or the batch operated on in the other physical node; and storing, in the memory storage of the physical node, results of the virtual network function or the component of the virtual network operating on the batch of data packets in the other physical node, with the storing using the RDMA operations. Variations of method 500 can include features of other methods and processes as taught herein.

In various embodiments, a non-transitory machine-readable storage device, such as computer-readable non-transitory media, can comprise instructions stored thereon, which, when performed by a machine, cause the machine to perform operations, where the operations comprise one or more features similar to or identical to features of methods and techniques described with respect to method 500, variations thereof, and/or features of other methods taught herein such as associated with FIGS. 1-8. The physical structures of such instructions may be operated on by one or more processors. Executing these physical structures can cause the machine to perform operations. A non-transitory computer-readable media storing computer instructions for handling data packets, that when executed by one or more processors, can cause the one or more processors to perform the steps of: classifying, with the one or more processors in a physical node of a plurality of physical nodes of a system, with each physical node of the plurality having one or more processors in communication with a memory storage in each physical node, each data packet of a set of data packets at the physical node; batching data packets of the set of data packets, forming a batch of data packets, based on the classification; and controlling access to the batch of data packets by another physical node of the separate physical nodes, using remote data memory access (RDMA).

The instructions can include a number of operations structured as steps. The steps can include, but are not limited to, operating a service or a virtual network function on the batch of data packets with the service or a virtual network function being a combination of separate modules of code with one or more separate modules of code in the memory storage of the physical node and one or more different separate modules of code in the memory storage of the other physical node. The steps can include classifying each data packet to include inserting information in a metadata area of each data packet, where the information includes data to identify a mapping of the service or the virtual network function to the data packet. Operations controlling access to the batch of data packets can include transmitting, after the batching, the batch of data packets to the other physical node by an RDMA write.

Figure 6:
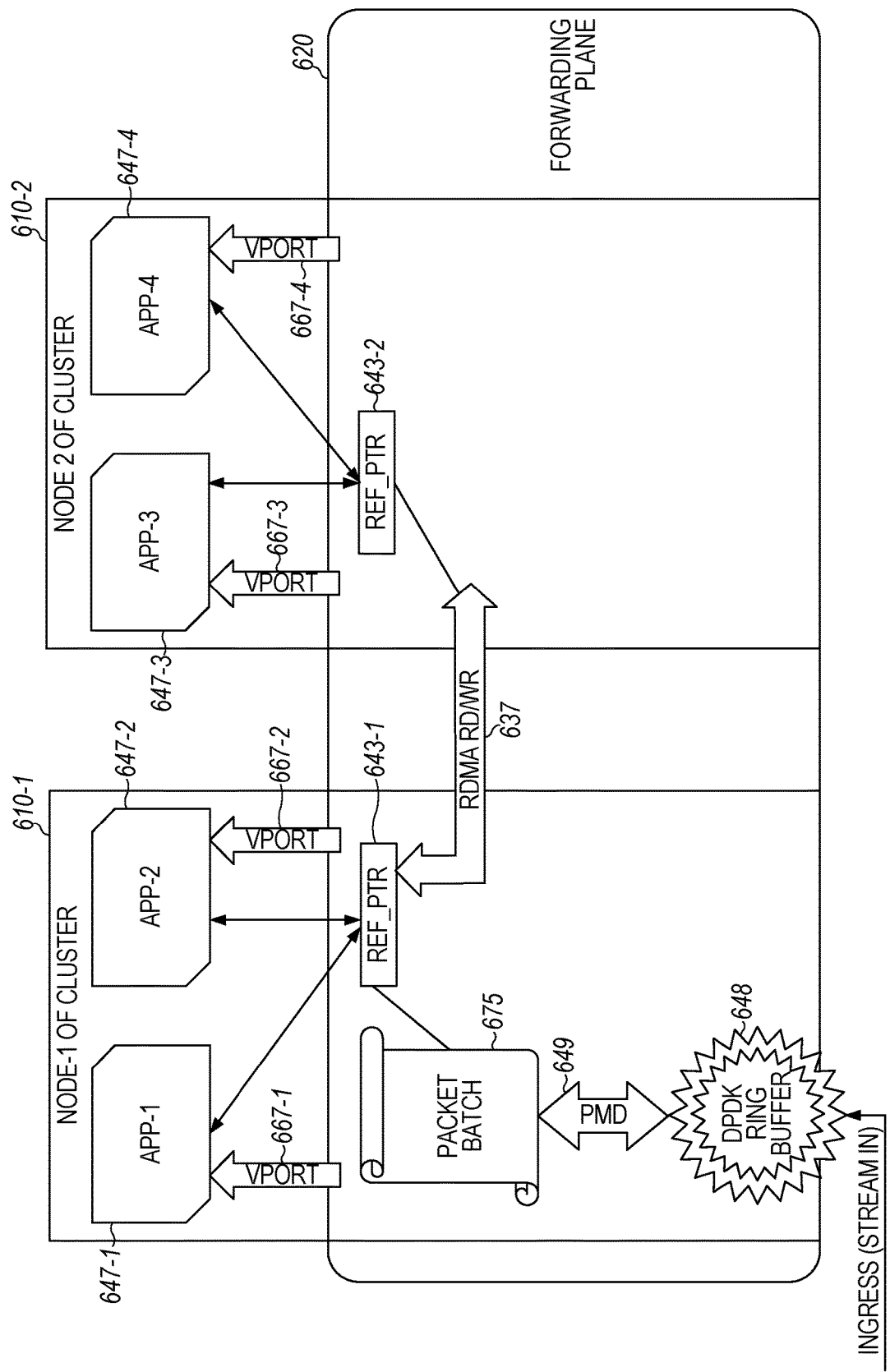
FIG. 6 is an illustration of application of remote data memory access to multicast across separate physical nodes in a forwarding plane of a software defined network, according to an example embodiment.

FIG. 6 is an illustration of application of RDMA to multicast across separate physical nodes in a forwarding plane 620 of a software defined network (SDN) in a system that generates local identifiers for data packets. Node 610-1 of a cluster of separate physical nodes receives an ingress of data packets, which may be streamed into node 610-1, at a DPDK ring buffer 648. The received data packets can be stored as single copy of a packet batch 675 delivered by a PMD 649 directly to the user space memory and assigned a reference pointer 643-1. In the forwarding plane 620, the data packets can be multicast to, but not limited to, application 647-1 and application 647-2 in node 610-1 depending on multicast_ID present in the metadata upon classification. Not shown in the diagram are the classifier as taught herein, prior to batching of data packets. Multicast is a mechanism where one set of packets are sent to multiple destinations, depending on a subscription. This prevents sending the same data multiple times over a data channel. Typically, a user configuration or a service subscription to a multicast_ID includes knowledge of all recipients of the the stream of data. The mechanism shown here assumes such a standard multicast configuration. The classifier has a configuration to attach a multicast_ID for a set of packets (a batch) and each application APP_1 647-1 and APP-2 647-2, if subscribed to that multicast_ID, can access packets from the same memory location 643-1. The virtual ports 667-1, 667-2 are used by applications APP_1 647-1 and APP-2 647-2 as network ports. The data packets can be multicast to, but not limited to, application 647-3 and application 647-4 in node 610-2 using RDMA read or write operations. A reference pointer 643-2 is created by using RTEP on node 610-2 and the applications 647-3 and 647-4 can access the packets using a locally available reference pointer, which in turn uses RTEP (runtime) to translate reads and writes as RDMA reads and writes to reference pointer 643-1 on node 610-1. Applications 647-3 and 647-4 subscribe to same multicast_ID, which is when the reference pointer 643-2 would be created on 610-2 (or any other remote node). In this configuration, application 647-1, application 647-2, application 647-3, and application 647-4 are end-points outside of forwarding plane 620.

Figure 7:
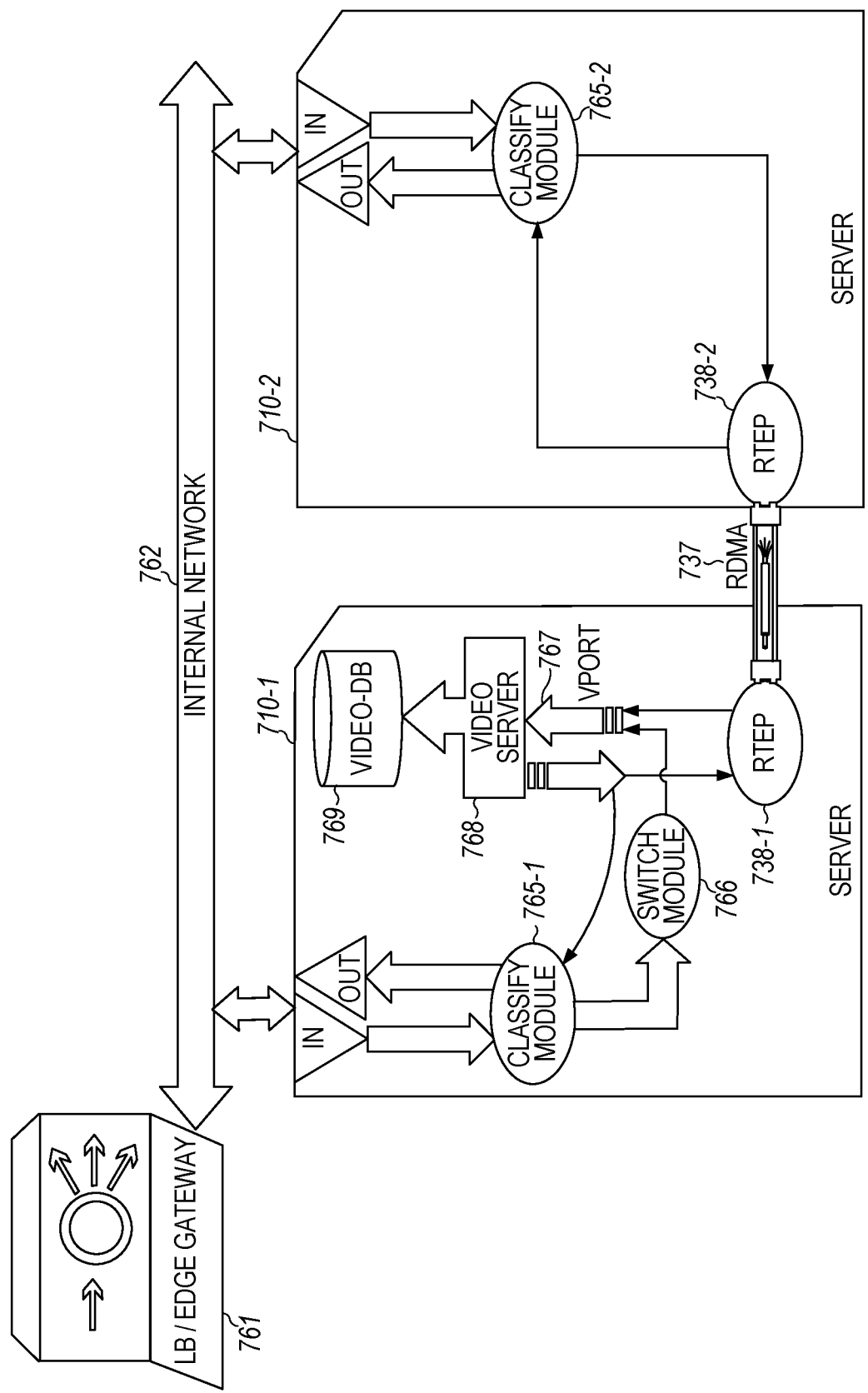
FIG. 7 is an illustration of an application of a remote data memory access tunnel end-point link between separate physical nodes at a location for distributed video streaming for high bandwidth, according to an example embodiment.

FIG. 7 is an illustration of an application of a RTEP link between separate physical nodes at a location for distributed video streaming for high bandwidth in a system that generates local identifiers for data packets. A server 710-1 and a server 710-2 can be arranged in a pipe aggregation of multiple servers that use a single video database (DB), where the single video database can be accessed using a RTEP link between server 710- and 710-2 at a given location. An internal network 762 is in communication with a load balancer (LB)/edge gateway 761. The internal network 762 may be operating at, but not limited to, a 100 GB. Data may be transported in and out of server 710-1 interfacing with internal network 762 at a lower rate than the operating rate of the internal network 762, for example at 10 GB. Other rates for interfacing between server 710-1 and internal network 762 may be used. Data may be transported in and out of server 710-2 interfacing with internal network 762 at a lower rate than the operating rate of the internal network 762, for example at 10 GB. Other rates for interfacing between server 710-2 and internal network 762 may be used.

Data packets in server 710-1 from internal network 762 may be classified by classify module 765-1 including generating local identifiers for the data packets, as taught herein. The classified data packets may be provided to a switch module 766, which can include an output gate for a path to vport 767 to provide the data packets to video server 768. Video server 768 can store received data packets in video DB 769. Video server 768 can provide video streaming to internal network 762, which may be through classify module 765-1 that strips all metadata before sending packets out.

Video server 768 can also provide video streaming to server 710-2 by using RTEP 738-1 in server 710-1 in conjunction with RTEP 738-2 in server 710-2 via RDMA 737. RTEP 738-2 can have an output gate to provide video streaming to internal network 762, which may be through a classify module 765-2 in server 710-2 that strips out metadata before sending packets out. In addition, data packets in server 710-2 from internal network 762 may be classified by classify module 765-2 including generating local identifiers for the data packets, as taught herein. Classify module 765-2 can have an output gate to send streaming video to video DB 769 in server 701-1 using RTEP 738-2 in server 710-2 in conjunction with RTEP 738-1 in server 710-1 via RDMA 737. From RTEP 738-1 in server 710-1, video streaming from server 710-2 can be provided to video DB 769 in server 710-1 via vport 767 to video server 768 that accesses video DB 769. By providing multiple channels for streaming out of video server 768 and 769 via multiple nodes increases the bandwidth of internal network 762 eventually reach its full capacity 100 GB.

Figure 8:
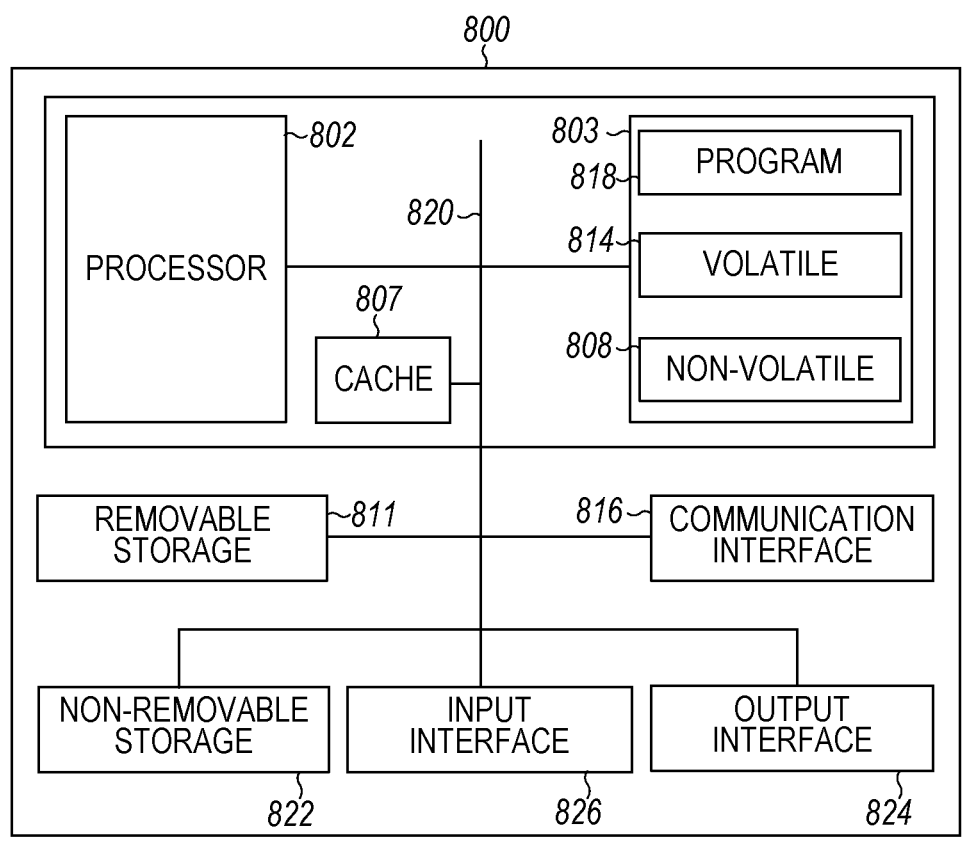
FIG. 8 is a block diagram illustrating circuitry for devices for implementing algorithms and performing methods of processing data packets in a system including batching data packets in one physical node of the system and controlling access to a data packet of the batch or to the batch using remote data memory access, according to an example embodiment.

FIG. 8 is a block diagram illustrating circuitry for devices for implementing algorithms and performing methods of processing data packets in a system including batching data packets in one physical node of the system and controlling access to a data packet of the batch or to the batch using remote data memory access, according to the teachings herein. FIG. 8 depicts a system 800 having a non-transitory memory storage 801 storing instructions, a cache 807, and a processing unit 802, coupled to a bus 820. Processing unit 802 can include one or more processors operatively in communication with non-transitory memory storage 801 and cache 807. The one or more processors can be structured to execute the instructions to operate system 800 according to any of the methods taught herein. The one or more processors can be structured to execute the instructions to: classify each data packet of a set of data packets at the physical node; batch data packets of the set of data packets, forming a batch of data packets, based on the classification; and control access to the batch of data packets by another physical node of the separate physical nodes, using remote data memory access (RDMA).

System 800 can include a communication interface 816 operable to communicate with a network external to system 800. The communication interface 816 can have the capability to communicate with other nodes of a cluster to process data packets to forward the data packets to their destinations. The communication interface 816 may be part of a data bus that can be used to receive data packets for processing.

Non-transitory memory storage 801 may be realized as machine-readable media, such as computer-readable media, and may include volatile memory 814 and non-volatile memory 808. System 800 may include or have access to a computing environment that includes a variety of machine-readable media including as computer-readable media, such as volatile memory 814, non-volatile memory 808, removable storage 811, and non-removable storage 822. Such machine-readable media may be used with instructions in one or more programs 818 executed by system 800. Cache 807 may be realized as a separate memory component or part of one or more of volatile memory 814, non-volatile memory 808, removable storage 811, or non-removable storage 822. Memory storage can include random access memory (RAM), read only memory (ROM), erasable programmable read-only memory (EPROM), electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

System 800 may include or have access to a computing environment that includes input 826 and output 824. Output 824 may include a display system, such as a touchscreen, that also may serve as an input device. The input 826 may include one or more of a touchscreen, touchpad, mouse, keyboard, camera, one or more device-specific buttons, one or more sensors integrated within or coupled via wired or wireless data connections to system 800, and/or other input devices.

System 800 may operate in a networked environment using a communication connection to connect to one or more other systems that are remote. Such remote systems may be similar to system 800 or may be different types of systems having features similar or identical to features of system 800 or other features, as taught herein, to handle batching of data packets in a physical node and controlling access from another physical node using RDMA. A plurality of systems similar to system 800 can be used as nodes of a cluster to handle forwarding of data packets in a network. Remote systems may include computers, such as database servers. Such remote computers may include a personal computer (PC), server, router, network PC, a peer device or other common network node, or the like. The communication connection may include a Local Area Network (LAN), a Wide Area Network (WAN), cellular, WiFi, Bluetooth, or other networks.

Machine-readable instructions, such as computer-readable instructions stored on a computer-readable medium, are executable by the processing unit 802 of the system 800. A hard drive, CD-ROM, and RAM are some examples of articles including a non-transitory computer-readable medium such as a storage system. The terms machine-readable medium, computer-readable medium, storage system, and storage device do not include carrier waves to the extent carrier waves are deemed transitory. Storage can also include networked storage such as a storage area network (SAN).

System 800 can be realized as a computing system that may be in different forms in different embodiments, as part of a network such as a SDN/IoT network. In addition, some of these devices may be considered as systems for the functions and/or applications for which they are implemented. Further, although the various data storage elements are illustrated as part of the system 800, the storage may also or alternatively include cloud-based storage accessible via a network, such as the Internet or server based storage.

Although the present disclosure has been described with reference to specific features and embodiments thereof, it is evident that various modifications and combinations can be made thereto without departing from scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A system, comprising:
a plurality of physical nodes, with a physical node including:
   a memory storage comprising instructions; and
   one or more processors in communication with the memory storage, wherein the one or more processors execute the instructions to:
      classify each data packet received at the physical node from an ingress in the system, for which the physical node is an original physical node for receiving the each data packet with respect to the plurality of physical nodes, with the classification including insertion of information in a metadata area of the each data packet, the information being inserted for processing the each data packet within the plurality of physical nodes, the information including an internal representation of the each data packet, with the internal representation including a destination identifier corresponding to a packet destination of the each data packet within the plurality of physical nodes;
      form at least one batch of data packets based on the classification; and
      control remote data memory access (RDMA) to the at least one batch of data packets by a second physical node of the plurality of physical nodes, using the internal representations in the metadata area of the data packets of the at least one batch to conduct the RDMA.

2. The system of claim 1, wherein the memory storage of the physical node includes one or more modules of code that are portions of instructions to operate as a service or a virtual network function on the at least one batch of data packets, and a second memory storage of the second physical node includes one or more second modules of code that are portions of the instructions to operate as the service or the virtual network function on the at least one batch of data packets.

3. The system of claim 2, wherein the information includes data to identify a data path to reach a service end point or to identify the virtual network function for the each data packet.

4. The system of claim 3, wherein the information in the each data packet of the at least one batch includes:
   the destination identifier corresponding to the service or to the virtual network function running on the second physical node; or
   a policy identifier, generated locally in the system, to identify a path to process the each data packet or portions of the path, the path including the service or the virtual network function on the second physical node.

5. The system of claim 2, wherein the one or more processors of the physical node execute instructions, after the forming of the at least one batch, to process the each data packet of the at least one batch by the one or more modules of code on the second physical node, with the processing of the each data packet comprising:
   transmitting a reference of the each data packet with a coded message to the second physical node;
   receiving a RDMA read request from the second physical node in response to transmitting the reference, and permitting reading of the data packet by the second physical node in response to the RDMA read request; and permitting an update of metadata of the each data packet in the physical node, in response to a RDMA write request from the second physical node, the update corresponding to the each data packet being processed by the one or more modules of code on the second physical node.

6. The system of claim 2, wherein the one or more processors of the physical node execute instructions to move the at least one batch of data packets to the second physical node, the move performed by an RDMA write, the move performed without involving a central processing unit (CPU), and the move performed after the forming of the at least one batch.

7. The system of claim 2, wherein the one or more processors of the physical node execute instructions to operate the virtual network function or a component of the virtual network function stored in the second memory storage of the second physical node, by executing instructions to:

hold the at least one batch of data packets in the memory storage of the physical node, including all classified and updated metadata of the data packets of the at least one batch, for access by the second physical node;

transfer, to the second physical node, access to a data packet of the at least one batch or to the at least one batch, including generating a signal to the second physical node as a request for a RDMA read operation by the physical node with respect to the data packet of the at least one batch or the at least one batch operated on in the second physical node; and store, in the memory storage of the physical node, results of the virtual network function or the component of the virtual network function operating on the at least one batch of data packets in the second physical node, with the storing using a RDMA write operation.

8. The system of claim 1, wherein the system includes a controller configured to identify a path for processing a data packet of the at least one batch in the plurality of physical nodes.

9. A computer-implemented method for handling data packets, comprising:

classifying, with one or more processors in a physical node of a plurality of physical nodes of a system, with each physical node of the plurality of physical nodes having one or more processors in communication with a memory storage in each physical node, each data packet received at the physical node from an ingress in the system, for which the physical node is an original physical node for receiving the each data packet with respect to the plurality of physical nodes, wherein the classification includes inserting information in a metadata area of the each data packet, the information being inserted for processing the each data packet within the plurality of physical nodes, the information including an internal representation of the each data packet, with the internal representation including a destination identifier corresponding to a packet destination of the each data packet within the plurality of physical nodes;

forming at least one batch of data packets based on the classification; and controlling remote data memory access (RDMA) to the at least one batch of data packets by a second physical node of the plurality of physical nodes, using the internal representations in the metadata area of the data packets of the at least one batch to conduct the RDMA.

10. The computer-implemented method of claim 9, wherein the method includes operating a service or a virtual network function on the at least one batch of data packets with the service or the virtual network function being a combination of modules of code with one or more modules of code in the memory storage of the physical node and one or more modules of code in a second memory storage of the second physical node.

11. The computer-implemented method of claim 10, wherein the information includes data to identify a data path to reach a service end point or to identify the virtual network function for the each data packet.

12. The computer-implemented method of claim 11, wherein the information in the each data packet of the at least one batch includes:

the destination identifier corresponding to the service or to the virtual network function running on the second physical node; or a policy identifier, generated locally in the system, to identify a path to process the each data packet or portions of the path, the path including the service or the virtual network function on the second physical node.

13. The computer-implemented method of claim 10, wherein the method includes, after the forming of the at least one batch, processing the each data packet of the at least one batch by the one or more modules of code on the second physical node, with the processing of the each data packet comprising:

transmitting a reference of the each data packet with a coded message to the second physical node;

receiving a RDMA read request from the second physical node in response to transmitting the reference, and permitting reading of the data packet by the second physical node in response to the RDMA read request; and permitting an update of metadata of the each data packet in the physical node, in response to a RDMA write request from the second physical node, the update corresponding to the each data packet being processed by the one or more modules of code on the second physical node.

14. The computer-implemented method of claim 10, wherein the method includes moving the at least one batch of data packets to the second physical node, the move performed by an RDMA write, the move performed without involving a central processing unit (CPU), and the move performed after the forming of the at least one batch.

15. The computer-implemented method of claim 10, wherein the method includes operating the virtual network function or a component of the virtual network function on the at least one batch of data packets including:

holding the at least one batch of data packets in the memory storage of the physical node, including all classified and updated metadata of the data packets of the at least one batch, for access by the second physical node;

transferring, to the second physical node, access to a data packet of the at least one batch or to the at least one batch, including generating a signal to the second physical node as a request for a RDMA read operation by the physical node with respect to the data packet of the at least one batch or the at least one batch operated on in the second physical node; and storing, in the memory storage of the physical node, results of the virtual network function or the component of the virtual network function operating on the at least one batch of data packets in the second physical node, with the storing using a RDMA write operation.

16. The computer-implemented method of claim 9, wherein the method includes using a controller to identify a path for processing a data packet of the at least one batch in the plurality of physical nodes.

17. A non-transitory computer-readable storage media storing computer instructions for handling data packets, that when executed by one or more processors, cause the one or more processors to perform the steps of:

classifying, with one or more processors in a physical node of a plurality of physical nodes of a system, with each physical node of the plurality of physical nodes having one or more processors in communication with a memory storage in each physical node, each data packet received at the physical node from an ingress in the system, for which the physical node is an original physical node for receiving the each data packet with respect to the plurality of physical nodes, wherein the classification includes inserting information in a metadata area of the each data packet, the information being inserted for processing the each data packet within the plurality of physical nodes, the information including an internal representation of the each data packet, with the internal representation including a destination identifier corresponding to a packet destination of the each data packet within the plurality of physical nodes;

forming at least one batch of data packets based on the classification; and controlling remote data memory access (RDMA) to the at least one batch of data packets by a second physical node of the plurality of physical nodes, using the internal representations in the metadata area of the data packets of the at least one batch to conduct the RDMA.

18. The non-transitory computer-readable storage media of claim 17, wherein the steps include operating a service or a virtual network function on the at least one batch of data packets with the service or the virtual network function being a combination of modules of code with one or more modules of code in the memory storage of the physical node and one or more modules of code in a second memory storage of the second physical node.

19. The non-transitory computer-readable storage media of claim 18, wherein the information includes data to identify a data path to reach a service end point or to identify the virtual network function for the each data packet.

20. The non-transitory computer-readable storage media of claim 17, wherein the controlling access to the batch of data packets includes moving the at least one batch of data packets to the second physical node, the move performed by an RDMA write, the move performed without involving a central processing unit (CPU), and the move performed after the forming of the at least one batch.

* * * * *